(12) United States Patent
Gong

(10) Patent No.: US 6,751,776 B1
(45) Date of Patent: Jun. 15, 2004

(54) METHOD AND APPARATUS FOR PERSONALIZED MULTIMEDIA SUMMARIZATION BASED UPON USER SPECIFIED THEME

(75) Inventor: Yihong Gong, Sunnyvale, CA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/369,421

(22) Filed: Aug. 6, 1999

(51) Int. Cl.[7] .............................................. G06F 15/00
(52) U.S. Cl. .................................... 715/500.1; 345/723
(58) Field of Search ....................... 715/500.1; 345/716, 345/723

(56) References Cited

U.S. PATENT DOCUMENTS

| | | | | |
|---|---|---|---|---|
| 5,835,667 A | * | 11/1998 | Wactlar et al. ................. | 386/96 |
| 6,172,675 B1 | * | 1/2001 | Ahmad et al. ............ | 715/500.1 |
| 6,185,329 B1 | * | 2/2001 | Zhang et al. ................ | 382/176 |
| 6,292,184 B1 | * | 9/2001 | Morgan ....................... | 345/600 |
| 6,298,482 B1 | * | 10/2001 | Seidman et al. ................ | 725/101 |
| 6,502,200 B2 | * | 12/2002 | Kashiwagi et al. ......... | 713/400 |
| 6,549,722 B2 | * | 4/2003 | Okada et al. ................. | 386/98 |
| 6,557,042 B1 | * | 4/2003 | He et al. ..................... | 709/231 |

OTHER PUBLICATIONS

Yeung et al., Video Visualization for Compact Presentation and Fast Browsing of Pictorial Content, IEEE 1997, pp. 771–785.*

Christel et al., Adjustable Filmstrips and Skims as Abstractions for Digital Video Library, IEEE May 1999, pp. 98–104.*

McKeown et al., Generating Summaries of Multiple News Articles, ACM 1995, pp. 74–82.*

Anonymous, Are training videos a crutch?, Training & Development, Dec. 1995, vol. 49, Iss. 12, p. 16.*

M. A. Smith and T. Kanade, "Video Skimming And Characterization Through The Combination Of Image And Language Understanding Techniques," *Proceedings of CVPR '97*, (Puerto Rico), pp. 775–781, 1997.

H. Wactlar, M. Christal, Y. Gong. and A. Hauptmann, "Lessons Learned From Building A Terebyte Digital Video Library," *IEEE Computer*, vol. 32, Feb. 1999.

D. DeMenthon, V. Kobla, and D. Doermann, "Video Summarization By Curve Simplification," Tech, Rep. LAMP–TR–018, Language and Media Processing Laboratory, University of Maryland, 1998.

Y. Yang, "An Evaluation Of Statistical Approaches To Text Categorization," *Information Retrieval Journal (to appear)*, 1999.

* cited by examiner

*Primary Examiner*—Stephen S. Hong
*Assistant Examiner*—Cong-Lac Huynh
(74) *Attorney, Agent, or Firm*—Sughrue Mion, PLLC

(57) ABSTRACT

An automatic video content summarization system that is able to create personalized multimedia summary based on the user-specified theme. The invention employs both natural language processing and video analysis techniques to extract important keywords from the closed caption text as well as prominent visual features from the video footage. The invention uses a Bayesian statistical framework that naturally integrates the user theme, the heuristics and the theme-relevant video characteristics within a unified platform.

25 Claims, 7 Drawing Sheets

METHOD AND APPARATUS FOR PERSONALIZED MULTIMEDIA SUMMARIZATION BASED UPON USER SPECIFIED THEME

TECHNICAL FIELD OF THE INVENTION

This invention is related to searching for information, specifically to a method for searching and creating a personalized multimedia summarization based upon user-input criteria. In particular, the multimedia summarization is based upon a user-specified theme, and multimedia imagery is searched, and imagery is selected for the summarization according to a statistical framework. The invention is embodied in a method, a computer system, and a computer program product that creates a personalized multimedia information summary.

BACKGROUND

The following papers provide useful background information on the indicated topics, all of which relate to the invention, and are incorporated herein by reference.

Heuristics used in video frame selection:

M. A. Smith and T. Kanade, *Video Skimming And Characterization Through The Combination Of Image And Language Understanding Techniques*, Proceedings of CVPR '97 (1997), pp. 775–81.

Comprehensive user studies:

H. Wactlar et al., *Lessons Learned From Building A Terabyte Digital Video Library*, IEEE Computer, vol. 32, February 1999.

Video summaries based exclusively on visual features:

D. DeMenthon et al., *Video Summarization By Curve Simplification*, Tech. Rep. LAMP-TR-018, Language and Media Processing laboratory, University of Maryland (1998).

Topic clustering:

Y. Yang, *An Evaluation of Statistical Approaches To Text Categorization*, Information Retrieval Journal (1999).

There will now be provided a discussion of various topics to provide a proper foundation for understanding the invention.

The rapid progress in computer, data storage and telecommunication has brought about a multimedia information era where image, audio and video data are becoming the information highways of our society. The advent of Internet and World-Wide Web has dramatically changed the manner in which people acquire and disseminate information and knowledge, as computer and telecommunication giants are teaming up with content providers to exploit the huge business potentials on Internet. Television broadcasters, newspaper publishers, entertainment companies, consumer product retailers and service retailers are expanding their presence on the Internet. Personal computers are quickly becoming an information housekeeper for the consumer, and are responsible for accessing and storing information from various sources such as online newspapers and broadcasters.

An inevitable consequence of this evolution is the rise of an overwhelming information glut. Nowadays, finding pieces of relevant information from Internet is fast becoming a difficult task. To facilitate rapid search and retrieval of relevant information from a huge number of information sources, the following two techniques will become indispensable:

Effective content-based indexing and search schemes for multimedia data including text, audio, image and video.

Automatic content summarizations for multimedia data collections.

Automatic content summarizations are equally as important as effective content-based indexing and search schemes for rapid search and retrieval of desired information. By way of example, assume that an attorney wants to study a particular lawsuit that has received much attention from the media. Further, assume that there are hundreds of digital video libraries available on the Internet for searching. If each digital video library provides a content summary listing the top one hundred topics included in the library, or a content overview that digests the whole news collection on the lawsuit in question, the officer will be able to easily figure out which subset of the libraries deserves a thorough search. In another example, assume that a personal information housekeeper records news broadcasts from all the major television broadcasters for a corporate CEO on a daily basis. The corporate CEO reviews the information gathered by the personal information housekeeper on a daily basis. If the information housekeeper can automatically create an updated summary of the gathered news broadcasts, the corporate CEO will be able to quickly identify news reports that are of interest and require further attention.

The above examples are but two representative cases that illustrate a search for particular information. In the first search type, the person has a particular topic to research, but does not know which data collection would provide the most useful information, and therefore should become the focus of further investigation. In the second search type, the person does not have a particular topic to research, but instead wishes to investigate whether a particular data collection contains any interesting subjects worthy of attention.

Various examples illustrate how content summaries are of great importance when people are searching for desired information. By way of example, assume a student enters a bookstore to buy an HTML reference book. As there are dozens of HTML reference books available on the shelf, the student has to rely on the book summaries, table of contents, or a quick browsing of the books in order to select one commensurate with the student's level of understanding and personal preference. Further, assume that another student comes to the bookstore wanting to find an interesting novel to read in the coming summer vacation. The student may first peruse the category signs shown on the shelves, and then determine a particular category to browse through. Next, the student may read the summary on the book jacket, or take a quick glance at some chapters if necessary, in order to select a suitably interesting novel.

There are three levels of content summaries for a digital video library: (1) library-wide summary that lists the major topics collected by the library; (2) topic-wide summary that summarizes the whole data collection for a particular topic; and (3) item-wide summary that digests the original video program into a shorter version. To date, most research studies in the literature have been for the automatic creation of item-wide summaries.

The video skimming technique developed by Carengie Mellon University summarizes individual TV news programs into a user-specified length based on a set of primitive heuristics. These heuristics include the selection of frames prior to the introduction of a proper name, frames from short shots, frames with both human faces and superimposed captions, and frames before or after a camera pan/zoom. Although the video skimming technique employs closed captions, video optical character recognition and various visual features with the intention of obtaining content-based video summaries, comprehensive user studies received mixed responses from the examiners who participated in the study.

On the other hand, the video summarization method of the Language and Media Processing group at the University of Maryland creates video summaries with a controllable length exclusively based on visual features of the video programs. The method first represents a video sequence as a trajectory curve in a high dimensional feature space, and then uses the recursive binary curve-splitting algorithm to approximate the video curve with a sequence of perceptually significant points. Each of the points on the video curve corresponds to a frame in the original video sequence. By showing the thumbnail images of the frames represented by these significant points, or by playing these frames sequentially, the user receives a summarized view of the original video sequence. As the curve splitting algorithm assigns more points to the curve segments with larger gradients, this summarization method naturally uses more frames to represent shots with more variations.

In spite of methodological differences, a separate method from Panasonic (Patent No. JP-8-251540) produces video summaries with a very similar characteristic to the Language and Media Processing group's method. More specifically, Panasonic's method is based on a set of video summarization rules that roughly sub-sample long shots with little changes and finely sub-sample short shots with big changes.

There is also literature on studies that exploit audio characteristics of the video sequence for summarization purposes. Nippon Telegraph and Telecommunication Corp.'s method (Patent No. JP-3-80728) detects semantically important audio patterns (e.g. applause, cheers) based on a predefined audio dictionary, and composes video summaries by selecting the video segments that contain these audio patterns.

A different method developed by MLS (Patent No. JP-8-334479) strives to score the importance of each shots based on its audio characteristics such as the inclusion of music, speech, special sound effects, etc, and then creates video summaries by picking up the shots with the highest scores.

Other video summarization methods have been reported in the literature. All are very similar to the methods described above in terms of methodologies, and underlying heuristics.

However in general, most of these existing methods have two major problems in common. First, these methods are usually based on a fixed set of heuristics that are derived either from common video production patterns or from common senses. As each particular video production pattern and common sense may or may not be a good indicator of important scenes depending on the video domain under the consideration, creating video summaries using these heuristics may satisfy only very limited types of applications.

Second, these methods do not take the requirements of the user into consideration in composing video summaries. Whether a video summary is good or not depends heavily on a user's initial requirements. For example, if a user is looking for news reports about a particular celebrity, the user may desire a human-centric video summary to include as many stored video scenes regarding that particular celebrity as possible. On the other hand, if a user has an interest in examining the damage that results from a natural disaster, the user may desire a nature-centric video summary to include nature scenes. Video summaries adaptive to personal desires are especially important when used as a means of information search and retrieval.

Although content summaries greatly facilitate information retrieval tasks, automatic multimedia content summarization has yet to receive as much attention from the multimedia information retrieval community as the research for content-based indexing and retrieval.

SUMMARY OF INVENTION

The invention has been made in view of the above circumstances and has an object to overcome the above problems and limitations of the prior art, and has a further object to provide the capability to create a multimedia summarization based upon a user-specified information need from a plurality of multimedia databases.

Additional objects and advantages of the invention will be set forth in part in the description that follows and in part will be obvious from the description, or may be learned by practice of the invention. The objects and advantages of the invention may be realized and attained by means of the instrumentalities and combinations particularly pointed out in the appended claims.

It is a further object of the invention to provide a method, a computer system and a computer program product for a multimedia summarization, wherein keywords or topic clustering is used to retrieve multimedia imagery from multimedia databases.

It is yet a further object of the invention to provide a method, a computer system and a computer program product for a multimedia summarization, wherein the user selects a theme in order to select relevant multimedia scene shots from the retrieved multimedia imagery.

It is still a further object of the invention to provide a method, a computer system and a computer program product for a multimedia summarization, wherein multimedia features are extracted from multimedia scene shots by using natural language processing and video analysis techniques to determine the relevance thresholds of the multimedia scene shots.

The above and other objects of the invention are accomplished by providing a method, a computer system and a computer program product for a multimedia summarization, wherein the relevance thresholds for determining whether a multimedia scene shot is included in the final multimedia summarization are set.

The above and further objects of the invention are further accomplished by providing a method, a computer system and a computer program product for a multimedia summarization, wherein the setting of relevance thresholds further includes the use of heuristic rules to assign relevance values to extracted multimedia features.

The above objects are further achieved by providing a method, a computer system and a computer program product for a multimedia summarization, wherein selected multimedia scene shots with high relevance scores to the user-specified theme are assembled into a multimedia summarization.

According to the invention, the invention extracts a predetermined number of multimedia features from each multimedia scene shot and measures the relevance between each feature and the user-specified theme.

According to the invention, the invention performs video analysis on the multimedia scene shots to detect and match human features, extract prominent colors, extract spatial features and to detect motion.

In further accordance with the above objects, the invention forms a subset of the selected multimedia scene shots based upon the relevance thresholds.

According to the invention, the invention removes duplicate multimedia scene shots from the multimedia scene shots that are most relevant prior to assembling the multimedia summarization.

BRIEF DESCRIPTION OF DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE INVENTION

Figure 1:
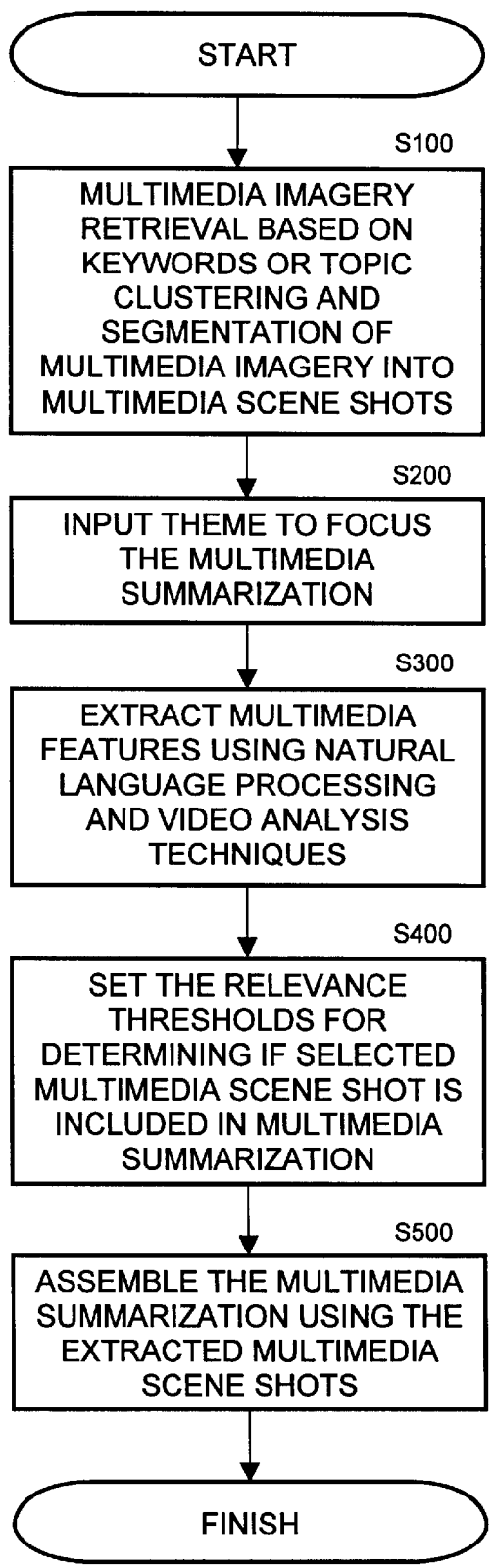
FIG. 1 depicts the basic process flow to create a multimedia summarization according the invention.

A detailed description of the preferred embodiments of the invention will now be given referring to the accompanying drawings.

As used herein, the term "multimedia imagery" is understood to be a medium that includes video data and corresponding audio data. The multimedia imagery can also include closed caption signals within the video data. The invention assumes that the multimedia imagery to be summarized is segmented into "multimedia scene shot" and that each multimedia scene shot consists of only visually similar frames. The invention is independent of any particular video format.

The invention provides a method and apparatus for multimedia summarization, wherein personalized multimedia summaries are created according to user-specified themes. The invention creates both topic-wide summaries for large collections of multimedia-based information, and item-wide summaries for long news video programs. The invention is not limited to the news video domain, but also operates on dramas and movies for the creation of personalized drama/movie summaries.

For topic-wide summarizations, the invention assumes that the multimedia database has already undergone topic clustering and each topic cluster contains only topically related items. To create a personalized multimedia summaries, the invention exploits the following concepts:
1. user-specified theme for initial data filtering;
2. heuristics for further data filtering;
3. identification of multimedia data that is closely related to the user-specified theme.

In processing of multimedia data, identifying the theme-relevant data relies on identifying the theme-relevant features within the multimedia data. In the past, statistical approaches have proven effective for finding useful patterns and important correlations among the data collection. The invention uses a Bayesian statistical framework that naturally integrates the user theme, the heuristics and the theme-relevant characteristics within a unified platform. The invention employs both the natural language processing techniques to extract important key words from the closed caption data and video analysis techniques to acquire prominent video features from the video data. Except for the extraction of who, when and where, all the feature extraction operations take each multimedia scene shot as the basic operation unit.

The language processing works on the closed caption data to extract important information such as who, where, and when (extracting "what" is plausible only for some specific domains such as business, news and legal documents). The language processing also extracts important keywords using the well-known TF-IDF technique.

The video analysis exploits various available techniques to detect human faces, prominent colors, motions, and edge distribution patterns from the frames within the multimedia scene shot. The purpose of detecting prominent colors and edge distribution patterns is to capture the scene configurations so as to facilitate the identification of similar scenes in the summarization process. The number of multimedia features varies among different multimedia scene shots. This is caused by the fact that different multimedia scene shots include different number of human faces, prominent colors, as well as important keywords.

Referring to FIG. 1, the method of the invention will now be described in summary fashion. The first step of the invention, as shown by Step S100, is to retrieve multimedia imagery relevant to the user-specified keywords or topics. This multimedia imagery retrieval can be realized either by using traditional keyword-based information retrieval techniques, or by using the topic clustering performed on the multimedia database. As described previously, the multimedia imagery that is retrieved is segmented into multimedia scene shots.

The multimedia imagery retrieval of Step S100 has the potential to return hundreds or even thousands of data items as a result of the keyword-based search or the topic clustering. The second step of the invention, as show by Step S200, requires the user to choose the theme of the multimedia summarization. This step will focus the multimedia summarization.

The third step of the invention, as shown by Step S300, is to extract multimedia features from each multimedia scene shot using natural language processing and video analysis techniques. The natural language processing enables the who, when, where, and important keywords to be extracted from each multimedia scene shot, while the video analysis strives to detect and match human faces, extract prominent color and spatial features, to detect motion, etc., from one representative frame within each multimedia scene shot. In the preferred embodiment, the tenth frame from the beginning of the multimedia scene shot is selected as the representative frame of that scene shot.

The next step of the invention, as shown by Step S400, is the relevance measurements between the user selected theme and the individual multimedia features obtained in Step S300. The relevance measurements of individual multimedia features are then combined according to the proposed statistical framework to determine the relevance score of each multimedia scene shot. This relevance score is used to determine which multimedia scene shot will be included in the multimedia summarization.

The final step of the invention, as shown in S500, is the assembling of the multimedia summarization from the selected multimedia scene shots. Upon completion, the summarization is ready for presentation to the user.

The output of the multimedia summarization is a video sequence that summarizes the set of multimedia scene shots retrieved in Step S100. The invention accesses a single multimedia library for processing, or it accesses a plurality of multimedia libraries. In the preferred embodiment, the library or libraries are stored in digital form.

Figure 2:
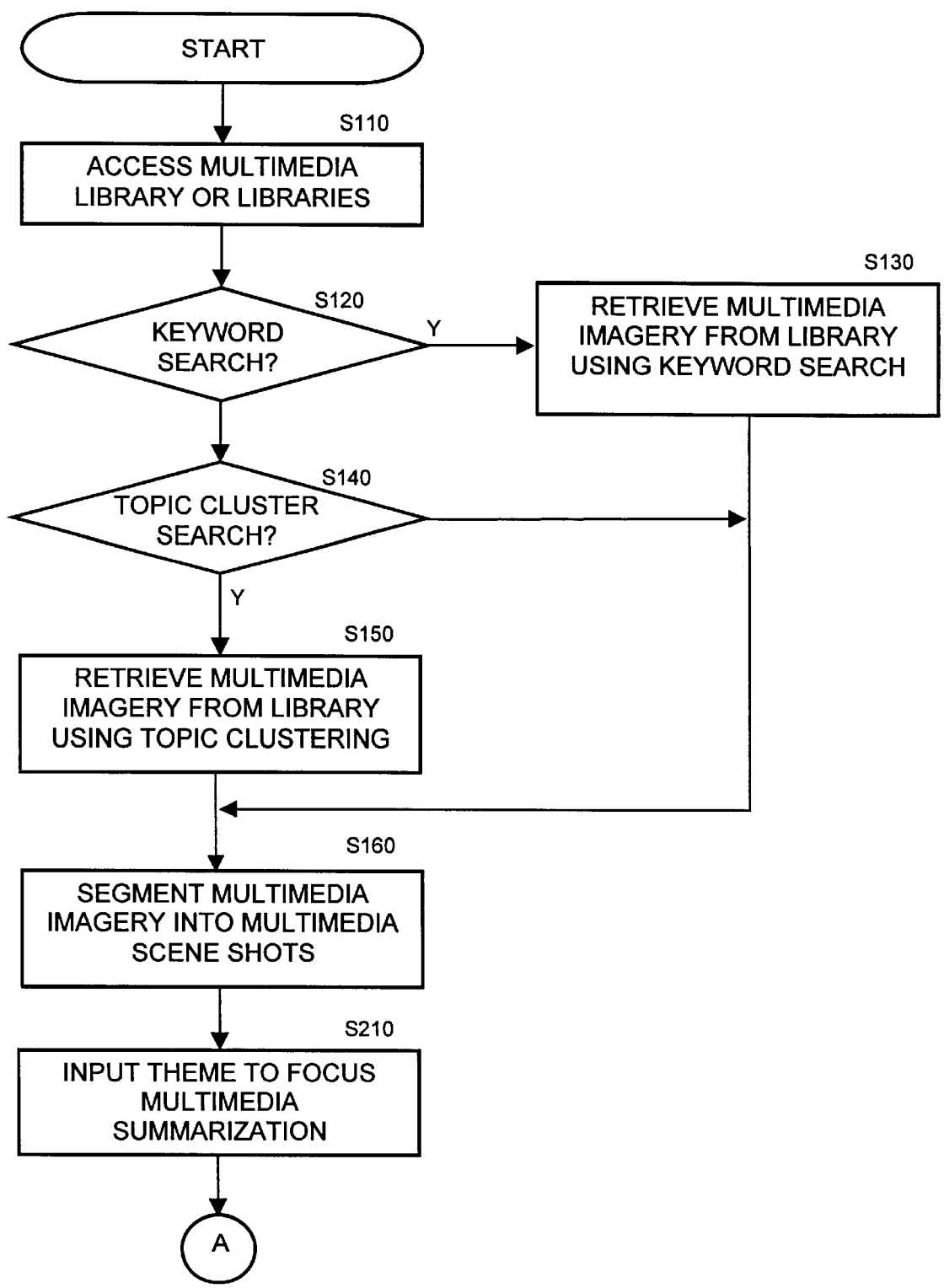
FIG. 2 depicts a more detailed process flow of the creation of a multimedia summarization according the invention.

Referring to FIG. 2, the retrieval of multimedia imagery will be discussed in greater detail. At Step 110, the invention accesses the multimedia libraries for extraction of multimedia imagery. The user determines whether the search for multimedia imagery will be performed using a traditional keyword search or topic clustering. At Steps S120–S130, if the user selected keyword searching, the invention extracts multimedia imagery from the multimedia library or libraries using the keywords input by the user. Otherwise, at Steps S140 and S150, if the user selected topic clustering, the invention extracts multimedia imagery from the multimedia library or libraries using the topic input by the user. The retrieved imagery is then segmented into multimedia scene shots in Step S160.

The user-specified theme T is the basis for the selection of multimedia scene shots in the summarization process. The theme T is selected by the user. As shown in Step S200 and discussed in the Background, the user inputs a theme into the invention (e.g. airline disasters) which then becomes the basis for the relevance measurements that results in a multimedia summarization.

The potential themes input by the user can be broken down into several types. A first type of summarization is based upon a particular person or a group of persons. This is referred to as a "who" summarization.

A second type of summarization is based on a particular scene types. This is referred to as a "what" summarization. For example, certain video scenes (e.g., an action sequence, a romantic interlude, a news conference, press announcements) have unique characteristics in their visual, audio and speech content. The invention makes use of these unique characteristics to create a summary based upon particular types of scenes.

A third type of summarization is based upon the timeline of a prolonged event (e.g., a highly publicized trial, a natural disaster and its aftermath, etc.). This is referred to as "when" summarization. This type of summary is meaningful only when the invention is creating a topic-wide summarization.

A fourth type of summarization is based upon prominent natural scenes. This is referred to as "where" summarization.

Figure 3:
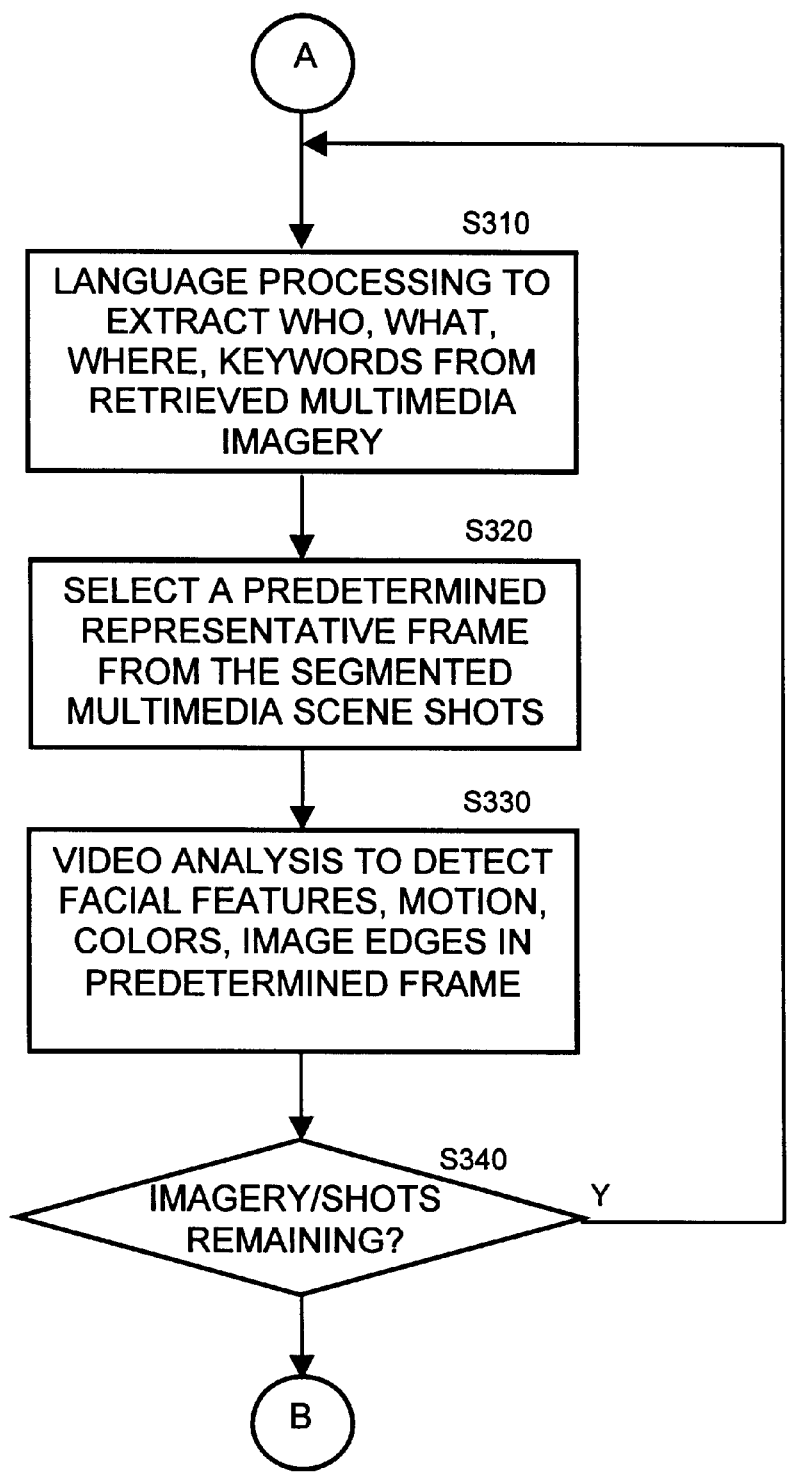
FIG. 3 is a continuation of the detailed process flow for the creation of a multimedia summarization.

Referring to FIG. 3, the extraction of multimedia features from the multimedia scene shots that were previously retrieved from the multimedia libraries will now be discussed in greater detail. As discussed above, the invention does not process every single frame within a multimedia scene shot. Rather, the invention selects a predetermined frame from all the frames that comprise a single multimedia scene shot. At Step S310, natural language processing enables the who, when, where, and important keywords to be extracted from the retrieved multimedia imagery. At Step S320, the invention selects the representative frame from a multimedia scene shot. Recall at Step S160 the retrieved multimedia imagery is segmented into multimedia scene shots. At Step S330, the video analysis detects and matches human faces, extracts prominent colors and spatial features, detect motions, etc., from the representative frame within the multimedia scene shot. At Step S340, the invention determines whether there are any more multimedia scene shots to process. If there are multimedia scene shots remaining, the process returns to Step S310 and extracts the representative frame from the next multimedia scene shot to be processed.

The relevance measurements will now be described in greater detail. As is known in the art, heuristics can be used to influence the relevance measurements. For example, heuristics that assign particular importance to multimedia scene shots containing superimposed text or to multimedia scene shots preceding or following a camera pan/zoom can be used to bias the outcome of the multimedia summarization.

As described in the Background, the invention segments each the multimedia imagery into individual multimedia scene shots prior to the summarization process. Given the user theme T and the set of multimedia scene shots V, the invention finds multimedia scene shots S∈V that are closely related to the theme T. The relevance of S to T can be measured by the probability P(T|S). According to Bayes theorem, $$P(T|S)=P(S|T)P(T) \quad \text{(Equation 1)}$$

As illustrated by Step S300 in FIG. 1, a multimedia scene shot S is represented by a set of multimedia features S={$s_1, s_2, \ldots$} where $s_i$ could be an important keyword, a particular human face, a prominent color, etc. Then, Equation (1) can be written as:

$$P(T|S) = P(s_1, s_2, \ldots |T)P(T) = P(T) \cdot \prod_i P(s_i|T) \quad \text{(Equation 2)}$$

where it is assumed that multimedia features are mutually independent given theme T. In Equation (2), P(T) is the prior probability that theme T holds in the multimedia scene shots V. Given the total time length L of V, and the user-specified time length τ for the summarized multimedia scene shots, P(T)=τ/L. P($s_i$|T) is defined as the probability that feature $s_i$ is related to theme T, and its value will be determined by heuristics, various video characteristics and their correlations.

Equation (2) will negatively affect the performance of the multimedia summarization. For example, assume a multimedia scene shot is described by five multimedia features, and that all but one feature are highly relevant to theme T. Because Equation (2) consists of the product of P($s_i$|T), one low relevant feature will drag the probability P(T|S) down to a small value. This, in turn, will result in the exclusion of a highly relevant multimedia scene shot from the final summary. Moreover, in estimating the probability P(T|S), it will be desirable to introduce some parameter to take into consideration of the overall distribution of P($s_i$|T) in addition to their absolute values.

To address the above problems, the invention replaces P($s_i$|T) with:

$$P(s_i|T)' = \exp\left(-\frac{1}{2\sigma^2}(1 - P(s_i|T))^2\right) \quad \text{(Equation 3)}$$

And the invention replaces P(T|S) with:

$$P(T|S)' = P(T) \cdot \ln \prod_i P(s_i|T)' = P(T) \cdot \sum_i -\frac{1}{2\sigma^2}(1 - P(s_i|T))^2 \quad \text{(Equation 4)}$$

In Equation (3), P($s_i$|T)' is a monotonic function of P($s_i$|T), because the data range of P($s_i$|T) is between 0.0 and 1.0. The introduction of parameter σ in P($s_i$|T)' to control how quickly P($s_i$|T)' decreases when P($s_i$|T) deviates from 1.0. By way of example, assume that the user has retrieved a set of multimedia scene shots S, and has specified a theme T for multimedia summarization. If all the multimedia features $s_i$ extracted from the multimedia scene shots S have very small values for $P(s_i|T)$, a relatively large σ results in a $P(s_i|T)'$ that will have relatively large values. On the other hand, if all the multimedia features $s_i$ extracted from the multimedia scene shots S have very large values for $P(s_i|T)$, a relatively small σ results in a $P(s_i|T)'$ that will quickly decrease when $P(s_i|T)$ deviates from 1.0.

Similarly, $P(T|S)'$ is a monotonic function of $P(T|S)$. $P(T|S)'$ replaces $P(T|S)$ because $P(T|S)'$ is much easier to compute than $P(T|S)$.

Through the use of Equation (4), the multimedia scene shots that are highly relevant to theme T will receive a score close to zero, while the multimedia scene shots that are not relevant to theme T will receive a large negative score.

Prior to the multimedia summarization process, the user must specify the time length τ of the multimedia summarization. As described in more detail below, each selected multimedia scene shot will be allotted a portion of the entire time length τ.

Figure 4:
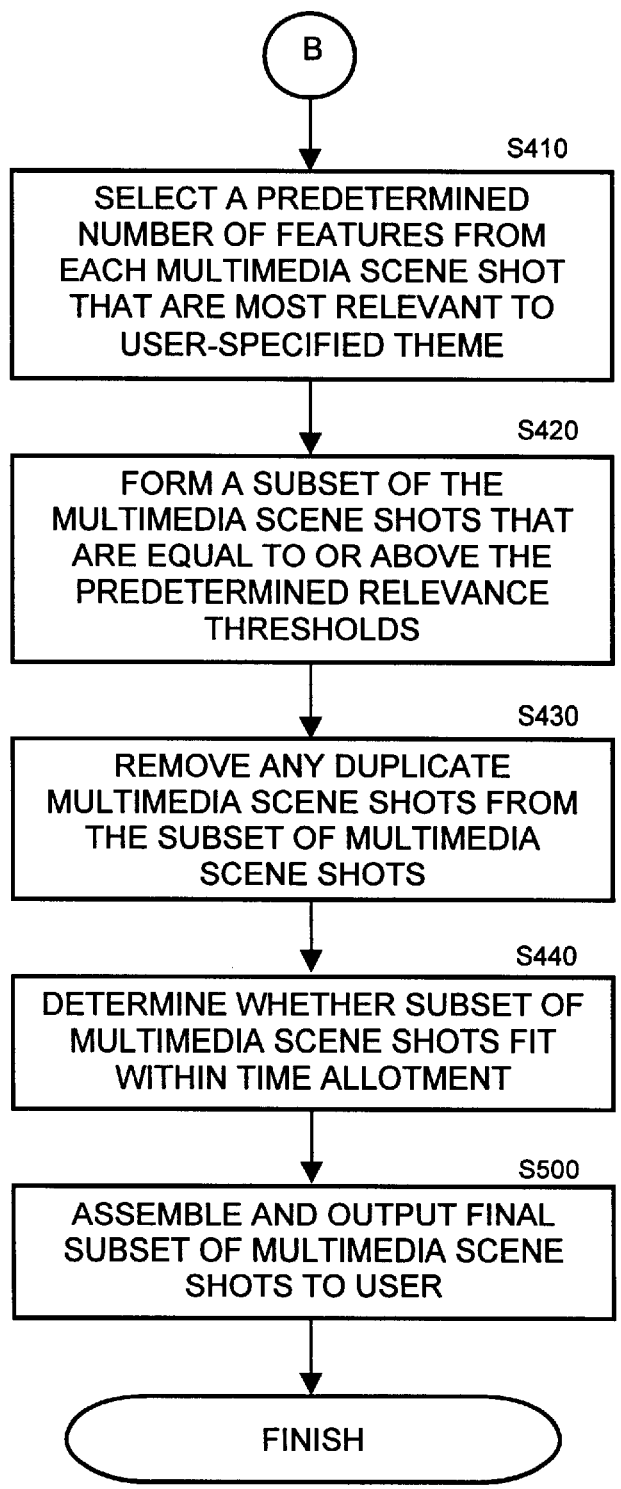
FIG. 4 is a continuation of the detailed process flow for the creation of a multimedia summarization.

Referring to FIG. 4, the relevance measurements between the user selected theme and the individual multimedia features will now be described in greater detail. In Step S410, for each multimedia scene shot S∈V, the invention selects a predetermined amount of multimedia features from its feature set $\{s_i\}$ that maximizes $P(T|S)'$, and calculates this maximum value. In the preferred embodiment, five multimedia features that are the most relevant to the specified theme T are used, but other amounts can also be used.

In Step S420, the invention forms a subset of multimedia scene shots equal to or above the relevance thresholds. Using Equation (4), the invention forms a subset $\Omega \subset V$ that consists of only the multimedia scene shot $\Omega_j$, where $T_R$ is a predetermined threshold. A default $T_R$ value of −0.5 is suggested.

$$P(T|\Omega_i)' > T_R \quad \text{Equation (5)}$$

To prevent duplicate multimedia scene shots from being included in the multimedia summarization, in Step S430 the invention performs the following operations. First, the invention creates a set φ, wherein φ={Ø}. A placeholder k is set equal to one. Next, for each multimedia scene shot $\Omega_k \in \Omega$, if k=1, the invention adds $\Omega_k$ to φ. Otherwise, the invention compares $\Omega_k$ with each $\Omega_j \in \phi$, where j=1,2, ..., k−1. If $\Omega_k$ satisfies Equation (6):

$$\min_{1 \le j \le k-1} D(\Omega_k, \Omega_j) > T_D \quad \text{(Equation 6)}$$

the invention adds $\Omega_k$ to φ, and increments k by one. In Equation (6), $T_D$ is the predefined threshold, and $D(\Omega_k, \Omega_j)$ is the Euclidean distance between $\Omega_k$ and $\Omega_j$, which is obtained by comparing the corresponding features of the two multimedia scene shots. A default $T_D$ range of 5 to 10 is suggested. The purpose of this test is to prevent duplicate multimedia scene shots from being included in the final summarization.

In Step S440, the invention determines the time-length of each selected multimedia scene shot as follows. Let n be the number of multimedia scene shots in φ. For each $\Omega_j \in \phi$, the invention calculates the time length:

$$\tau_j = \left(1 - \left|\frac{P(T|\Omega_j)}{\sum_i^n P(T|\Omega_i)}\right|\right) \cdot \tau \quad \text{(Equation 7)}$$

where τ is the user specified time length for the multimedia summarization The invention includes shot $\Omega_j$ in the final multimedia summarization with the time length $\tau_j$.

The determination of $P(s_i|T)$ for each multimedia feature $s_i$ will now be described in greater detail. Any multimedia summarization should include at least these four heuristic rules for the determination, but the invention is not limited to these rules, as others may be used as desired.

The first heuristic rule used by the invention is "maximum relevance," wherein features that are conceptually identical to the user-specified theme T will be assigned the maximum relevance value of 1.0. By way of example, if a particular celebrity is the theme for a multimedia summary, then that celebrity's facial features and the celebrity's name extracted from the speech transcript are the most relevant multimedia features. These features will be assigned a relevance value of 1.0.

The second heuristic rule used by the invention is "propagation," wherein features that are highly correlated with the maximum relevance feature will be assigned a high relevance value. By way of example, assume that in a given multimedia imagery set, a second set of features belonging to another person often appears with the maximum relevance feature. The features belonging to the second person will be regarded as a highly relevant multimedia feature.

The third heuristic rule used by the invention is "interleaving," wherein features that appear in a sequential or alternating manner with the maximum relevance feature will be assigned high relevance values. For example, in an interview scene, the camera switches frequently between the interviewer and the interviewee. Similarly, a video news story that describes the achievement of a scientist, the multimedia scene shot will switch frequently between the scientist and his research activities. In these cases, if one multimedia feature (e.g., the interviewer or the scientist) is the maximum relevance feature, then the interleaved features will be assigned high relevance values.

The fourth heuristic rule used by the invention is "association," wherein a particular keyword, or a set of particular keywords are the theme of summary. Multimedia features that are in the same category of the keywords will be assigned high relevance values. By way of example, assume that the user has specified violent scenes as the theme of summary. In this case, the invention collects a large sample set of keywords that typically appear in violent scenes. Based on this sample set, the invention utilizes machine learning techniques to classify the incoming word as belonging to a violent scene. After the words are positively classified, they will be regarded as highly relevant multimedia features.

One embodiment of this invention resides in a computer system. Hence, the term "computer system" is to be understood to include at least a memory and a processor. In general, the memory will store, at one time or another, at least portions of an executable program code, and the processor will execute one or more of the instructions included in that executable program code. It will be appreciated that the term "executable program code" and the term "software" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

Figure 5:
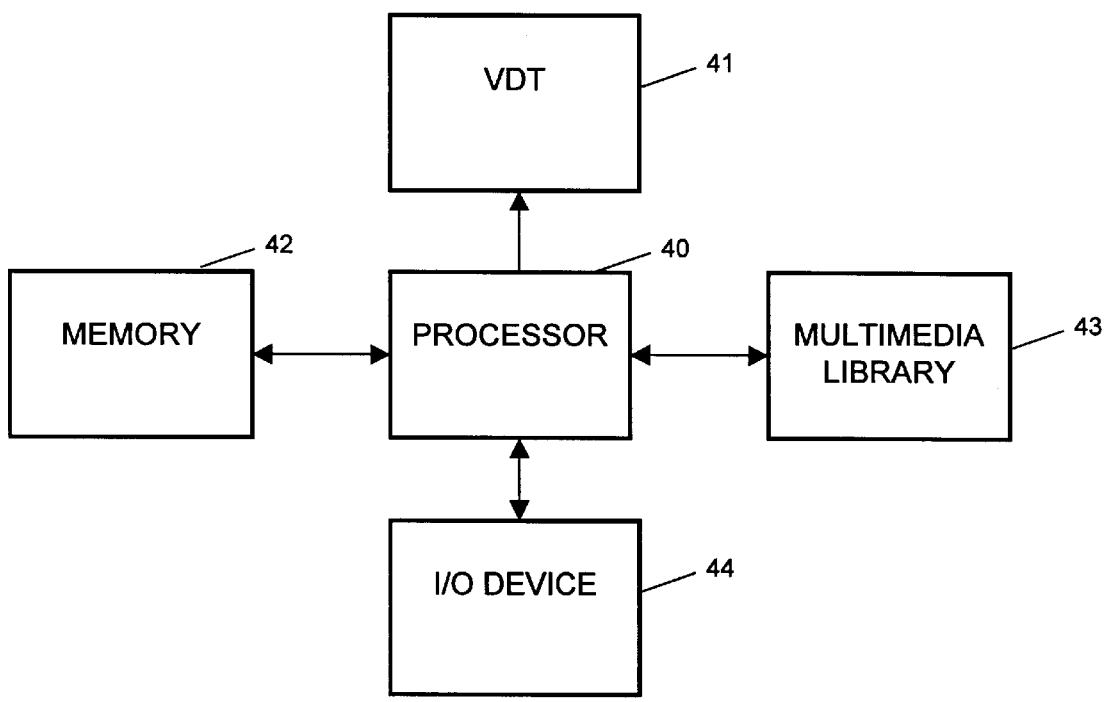
FIG. 5 illustrates a computer embodiment of the invention.

Referring to FIG. 5, the invention is embodied by a computer system adapted to creating a multimedia summarization that includes a processor 40, I/O devices 44, a video display terminal 41 and a multimedia library or libraries 43. The multimedia library 43 may be embodied on any number of different mediums (e.g., floppy disk, hard disk, optical disk, cartridge, tape, CD-ROM, writable CD, etc.). The computer system further includes a memory 42 including software instructions adapted to enable the computer system to perform the steps of the invention as described.

The software instructions are adapted to enable the computer system to retrieve multimedia imagery relevant to the user-specified keywords or topics. This multimedia imagery retrieval can be realized either by using traditional keyword-based information retrieval techniques, or by using the topic clustering performed on the multimedia database. Input of the user-specified keywords or topics into the computer system for the keyword-based search or topic cluster search is accomplished through an I/O device. In addition, input of the theme and relevance thresholds is accomplished in through an I/O device.

The multimedia imagery retrieved by the computer system has the potential to return hundreds or even thousands of data items as a result of the keyword-based search or the topic clustering. The multimedia imagery is segmented into multimedia scene shots following its retrieval. The computer system to queries the user to input the theme of the multimedia summarization, so as to focus the multimedia summarization.

Next, the computer system extracts multimedia features from each multimedia scene shot using natural language processing and video analysis techniques. The computer system performs natural language processing, namely extracting the who, when, where, and important keywords on the retrieved multimedia imagery. The computer system also performs video analysis, wherein the computer strives to detect and match human faces, extract prominent color and spatial features, to detect motion, etc., from each representative frame within each multimedia scene shot.

Following the feature extraction, the computer system calculates relevance measurements between the user-selected theme and the individual multimedia features. The computer system combines the relevance measurements of individual multimedia features according to the proposed statistical framework in order to determine the relevance score of each multimedia scene shot. The computer system uses this relevance score to determine which multimedia scene shot will be included in the multimedia summarization.

Once the relevance measurements are complete, the computer system assembles the multimedia summarization from the selected multimedia scene shots that were selected during the relevance measurements. Upon completion, the summarization is ready for presentation to the user.

Figure 6:
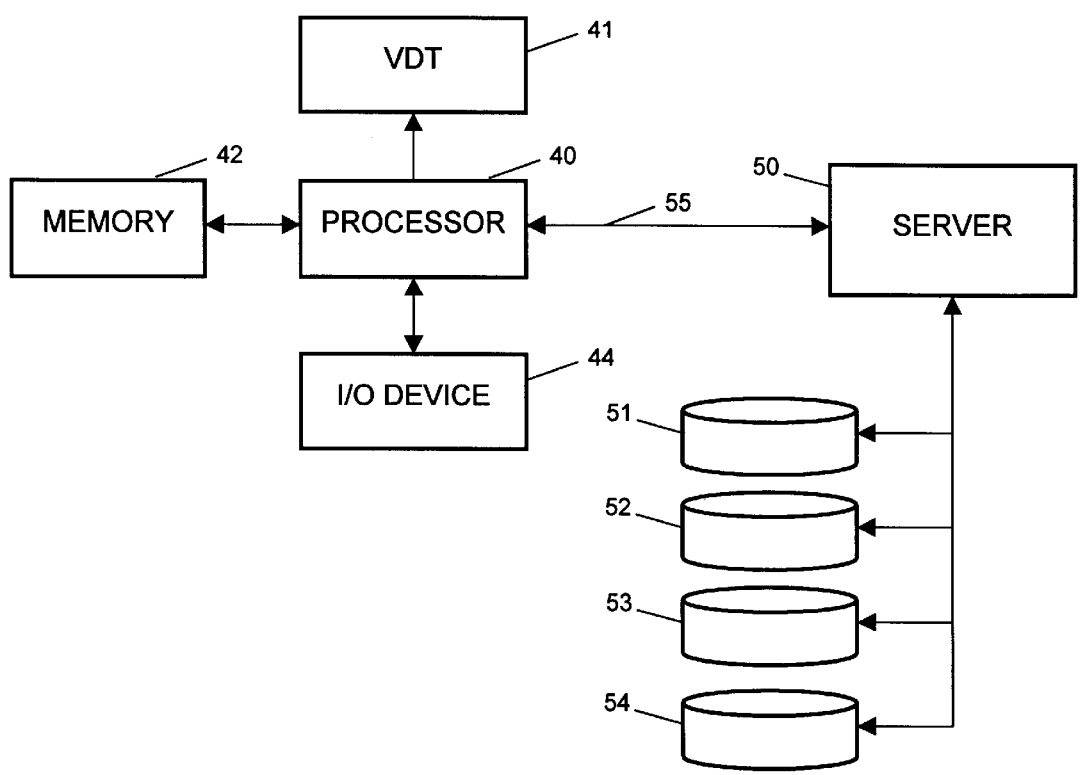
FIG. 6 illustrates a first computer network embodiment according to the invention.

Referring to FIG. 6, the invention is embodied by a computer system network adapted to creating a multimedia summarization that includes a processor 40, I/O devices 44, and a video display terminal 41. The computer system further includes a memory 42 including software instructions adapted to enable the computer system to perform the steps of the invention as described.

Instead of multimedia libraries directly connected to the computer as described above, the computer network embodiment incorporates a server 50, connected to the processor 40 by a data link 55. The data link 55 is a conventional data link (e.g., Ethernet, twisted pair, FTP, HTTP, etc.) as is well-known in the art. The server 50 provides access to the multimedia libraries 51–54 connected to the server. As described above, the multimedia libraries 51–54 may be embodied on any number of different mediums (e.g.:, floppy disk, hard disk, optical disk, cartridge, tape, CD-ROM, writable CD, etc.) as are known in the art.

The software instructions on the memory 42 allow the processor 40 to access the server 50 via the data link 55, thereby providing access to the multimedia libraries 51–54. The multimedia summarization process is implemented as described above.

Figure 7:
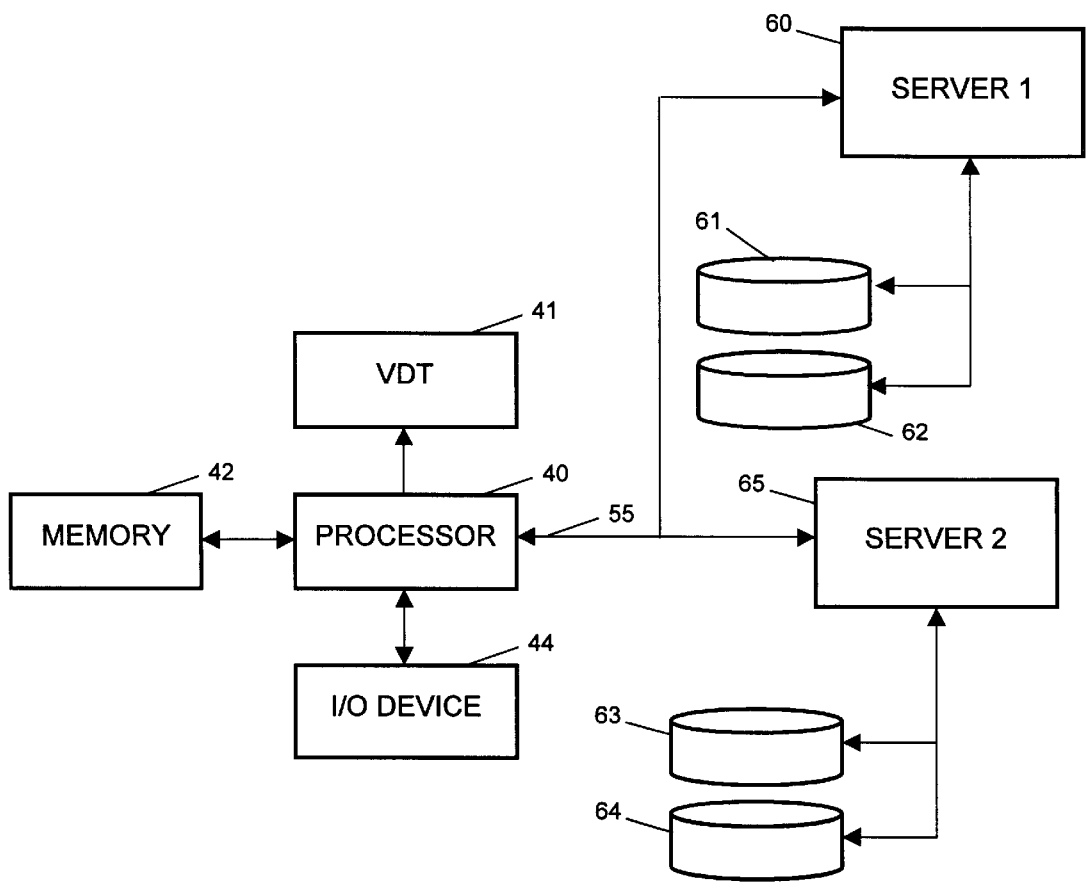
FIG. 7 illustrates a second computer network embodiment according to the invention.

Referring to FIG. 7, the invention is embodied by a second computer system network adapted to creating a multimedia summarization that includes a processor 40, I/O devices 44, and a video display terminal 41. The computer system further includes a memory 42 including software instructions adapted to enable the computer system to perform the steps of the invention as described.

Instead of multimedia libraries directly connected to the computer as described above, the computer network embodiment incorporates two servers 60,65 connected to the processor 40 by a data link 55. The data link 55 is a conventional data link (e.g.: Ethernet, twisted pair, FTP, HTTP, etc.) as is well-known in the art. The servers 60,65 provides access to the multimedia libraries 61–64 connected to the servers. As described above, the multimedia libraries 61–64 may be embodied on any number of different mediums (e.g.:, floppy disk, hard disk, optical disk, cartridge, tape, CD-ROM, writable CD, etc.) as are known in the art. The software instructions on the memory 42 allow the processor 40 to access the servers 60,65 via the data link 55, thereby providing access to the multimedia libraries 61–64. The multimedia summarization process is implemented as described above. The invention is not limited to a maximum of two servers, as any number of servers or other configurations of server, processor and data link can be constructed by a skilled artisan.

The invention may be embodied in a computer program product, as will now be explained.

On a practical level, the software that enables the computer system to perform the operations, described further below in detail, may be supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media," or "computer-readable media," as used here, may include a diskette, a tape, a compact disc, an integrated circuit, a ROM, a CD, a cartridge, a remote transmission via a communications circuit, or any other similar medium useable by computers. For example, to supply software for enabling a computer system to operate in accordance with the invention, the supplier might provide a diskette or might transmit the software in some form via satellite transmission, via a direct telephone link, or via the Internet. Thus, the term, "computer readable medium" is intended to include all of the foregoing and any other medium by which software may be provided to a computer.

Although the enabling software might be "written on" a diskette, "stored in" an integrated circuit, or "carried over" a communications circuit, it will be appreciated that, for the purposes of this application, the computer usable medium will be referred to as "bearing" the software. Thus, the term "bearing" is intended to encompass the above and all equivalent ways in which software is associated with a computer usable medium.

For the sake of simplicity, therefore, the term "program product" is thus used to refer to a computer useable medium, as defined above, which bears in any form of software to enable a computer system to operate according to the above-identified invention.

Thus, the invention is also embodied in a program product bearing software that enables a computer to perform multimedia summarization according to the invention. The computer program product enables a computer to create a multimedia summarization, wherein the software instructions enable the computer to perform the invention. A computer readable medium bears the software instructions.

The computer program product enables a computer to retrieve multimedia imagery relevant to the user-specified keywords or topics. This multimedia imagery retrieval can be realized either by using traditional keyword-based information retrieval techniques, or by using the topic clustering performed on the multimedia database. The retrieved multimedia imagery is segmented into multimedia scene shots following the retrieval process. Input of the user-specified keywords, topics, themes or relevance thresholds into the computer system is usually accomplished through an I/O device.

The multimedia imagery retrieved by the software instructions has the potential to return hundreds or even thousands of data items as a result of the keyword-based search or the topic clustering. The computer program product enables a computer to require the user to choose the theme of the multimedia summarization, so as to focus the multimedia summarization.

Next, the computer program product enables a computer to extract multimedia features from each multimedia scene shot using natural language processing and video analysis techniques. The computer program product enables a computer to perform natural language processing, namely extracting the who, when, where, and important keywords from the retrieved multimedia imagery. The computer program product enables a computer to perform video analysis, wherein the computer strives to detect and match human faces, extract prominent color and spatial features, to detect motion, etc., from each representative frame within each multimedia scene shot.

After the extraction is complete, the computer program product enables a computer to perform relevance measurements between the user-selected theme and the individual multimedia features. The computer program product commands the computer to combine the relevance measurements of individual multimedia features according to the proposed statistical framework in order to determine the relevance score of each multimedia scene shot. The computer program product commands the computer to use this relevance score to determine which multimedia scene shot will be included in the multimedia summarization.

Following the relevance measurements, the computer program product enables a computer to perform to assemble the multimedia summarization from the selected multimedia scene shots. Upon completion, the summarization is ready for presentation to the user.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as is are suited to the particular use contemplated.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A method for creating a multimedia summarization, said method comprising:

retrieving multimedia imagery;

choosing a theme for said multimedia summarization, whereby said theme selects a plurality of multimedia scene shots from said multimedia imagery;

setting a time length limit for said multimedia summarization;

extracting multimedia features from said plurality of multimedia scene shots based upon said theme;

setting relevance thresholds for determining which of said plurality of multimedia scene shots will be included in said multimedia summarization based upon said multimedia features;

selecting multimedia scene shots from said plurality of multimedia scene shots, wherein multimedia scene shots with a relevance equal to or higher than said relevance thresholds are selected for said multimedia summarization; and allotting a portion of said time length limit to each selected multimedia scene shot, wherein the amount of time allotted to a selected multimedia scene shot is proportional to its relevance.

2. The method as set forth in claim 1, wherein said multimedia imagery comprises multimedia scene shots stored in at least one digital library.

3. The method as set forth in claim 2, wherein said at least one digital library comprises a plurality of digital libraries.

4. The method as set forth in claim 1, wherein the retrieval of said multimedia imagery is based upon a keyword search.

5. The method as set forth in claim 1, wherein the retrieval of said multimedia imagery is based upon topic clustering.

6. The method as set forth in claim 1, wherein said theme will create a multimedia summarization based upon at least one person.

7. The method as set forth in claim 1, wherein said theme will create a multimedia summarization based upon at least one keyword.

8. The method as set forth in claim 1, wherein said theme will create a multimedia summarization based upon the timeline of a prolonged event.

9. The method as set forth in claim 1, wherein said theme will create a multimedia summarization based upon natural scenes.

10. The method as set forth in claim 1, wherein extracting multimedia features comprises natural language processing to extract keywords from said plurality of multimedia scene shots.

11. The method as set forth in claim 1, wherein the extraction of multimedia features further comprises selecting a predetermined number of multimedia features from each multimedia scene shot, whereby the selection of the multimedia features are the most relevant to said theme.

12. The method as set forth in claim 11, wherein extracting multimedia features comprises video analysis to detect and match human features from a multimedia scene shot.

13. The method as set forth in claim 11, wherein extracting multimedia features comprises video analysis to extract prominent colors from a multimedia scene shot.

14. The method as set forth in claim 13, wherein the multimedia scene shots are processed according to heuristic rules.

15. The method as set forth in claim 14, wherein said heuristic rules further comprise assigning a predetermined relevance value to a multimedia feature that is closely relevant to the theme.

16. The method as set forth in claim 14, wherein said heuristic rules further comprise assigning a predetermined relevance value to a multimedia feature that correlates to the maximum relevance feature.

17. The method as set forth in claim 14, wherein said heuristic rules further comprise assigning a predetermined relevance value to a multimedia feature that is interleaved with the maximum relevance feature.

18. The method as set forth in claim 14, wherein said heuristic rules further comprise assigning a predetermined relevance value to a multimedia feature based upon a keyword.

19. The method as set forth in claim 11, wherein extracting multimedia features comprises video analysis to extract spatial features from a multimedia scene shot.

20. The method as set forth in claim 11, wherein extracting multimedia features comprises video analysis to detect motion within a multimedia scene shot.

21. The method as set forth in claim 1, wherein extracting multimedia features further comprises selecting a predetermined frame from a multimedia scene shot for multimedia feature extraction, and designating said frame as representative of the multimedia scene shot.

22. The method as set forth in claim 21, wherein processing further comprises forming a subset of the individual multimedia scene shots based upon the relevance threshold.

23. The method as set forth in claim 22, wherein the processing further comprises removal of duplicate multimedia scene shots from the subset of individual multimedia scene shots.

24. A computer system adapted to creating a multimedia summarization, said system comprising:
  a processor;
  a memory including software instructions adapted to enable the computer system to perform the steps of:
    receiving a theme for the multimedia summarization input by the user;
    receiving relevance thresholds for determining if a particular multimedia scene shot will be included in the multimedia summarization requested by the user;
    receiving a time length limit for the multimedia summarization;
    retrieving multimedia imagery;
    extracting a plurality of multimedia scene shots from said multimedia imagery;
    extracting multimedia features from said plurality of multimedia scene shots based upon said theme;
    measuring the relevance of said plurality of multimedia scene shots; and
    selecting multimedia scene shots from said plurality of multimedia scene shots, wherein multimedia scene shots with a relevance equal to or higher than said relevance thresholds are selected for said multimedia summarization; and
  allotting a portion of said time length limit to each selected multimedia scene shot, wherein the amount of time allotted to a selected multimedia scene shot is proportional to its relevance.

25. A computer program product for enabling a computer to create a multimedia summarization, comprising:
  software instructions for enabling the computer to perform predetermined operations, and a computer readable medium bearing the software instructions;
  the predetermined operations including the steps of:
    receiving a theme for the multimedia summarization input by the user;
    receiving relevance thresholds for determining if a particular multimedia scene shot will be included in the multimedia summarization requested by the user;
    receiving a time length limit for the multimedia summarization;
    retrieving multimedia imagery;
    extracting a plurality of multimedia scene shots from said multimedia imagery;
    extracting multimedia features from said plurality of multimedia scene shots based upon said theme;
    measuring the relevance of said plurality of multimedia scene shots; and
    selecting multimedia scene shots from said plurality of multimedia scene shots, wherein multimedia scene shots with a relevance equal to or higher than said relevance thresholds are selected for said multimedia summarization; and
  allotting a portion of said time length limit to each selected multimedia scene shot, wherein the amount of time allotted to a selected multimedia scene shot is proportional to its relevance.

* * * * *